United States Patent [19]

Knight

[11] Patent Number: 4,667,535

[45] Date of Patent: May 26, 1987

[54] DIFFERENTIALS

[75] Inventor: David J. Knight, Billingshurst, England

[73] Assignee: Jack Knight (Developments) Limited, Woking, England

[21] Appl. No.: 688,777

[22] Filed: Jan. 4, 1985

[30] Foreign Application Priority Data

Jan. 6, 1984 [GB] United Kingdom ................. 8400245

[51] Int. Cl.$^4$ ............................................. F16H 1/38
[52] U.S. Cl. ........................................ 74/715; 74/710
[58] Field of Search ................................. 74/715, 710

[56] References Cited

U.S. PATENT DOCUMENTS

| | | | |
|---|---|---|---|
| 1,365,756 | 1/1921 | Williams | 74/715 |
| 1,404,791 | 1/1922 | Nosgrady | 74/715 |
| 1,730,184 | 10/1929 | Wildhaber | 74/715 |
| 2,559,916 | 7/1951 | Gleasman | 74/715 |
| 2,631,475 | 3/1953 | Gleasman | 74/715 |
| 2,666,343 | 1/1954 | Casa-Massa | 74/715 |
| 2,859,641 | 11/1958 | Gleasman | 74/715 |
| 3,343,429 | 9/1967 | Frost | 74/715 |
| 3,849,862 | 11/1974 | Benjamin | 74/715 X |
| 4,191,071 | 3/1980 | Gleasman et al. | 74/715 |
| 4,491,035 | 1/1985 | Gleasman et al. | 74/715 |

FOREIGN PATENT DOCUMENTS 512770 12/1937 United Kingdom .

Primary Examiner—Leslie Braun
Assistant Examiner—Dwight G. Diehl
Attorney, Agent, or Firm—Flynn, Thiel, Boutell & Tanis

[57] ABSTRACT

A limited slip differential for a vehicle having a gear carrier mounted for rotation about its longitudinal axis. A pin extends within the carrier and has it axis transverse to the carrier axis, the pin being mounted by its ends in the carrier. First and second worm wheels are rotatably mounted on the pin. Four helically toothed worm members are rotatably mounted in the carrier with the axis of each worm member extending longitudinally in the carrier. The first and third worm members mesh with a one of the worm wheels on opposite portions of the circumference thereof, and the second and fourth worm members mesh with the other worm wheel on opposite portions of the circumference thereof. A spacer block is mounted on the pin and has on two opposed faces thereof worm wheel locating surfaces each to engage a first side surface of a respective one of the worm wheels. The carrier has two further worm wheel locating surfaces to engage second side surfaces of the worm wheels. First and second helical sun gears are coaxial with the carrier axis, each sun gear being rotatably mounted with respect to the carrier. The first sun gear meshes with extension portions of the helical teeth on the second and third worm members, and the second sun gear meshes with extension portions of the helical teeth on the first and fourth worm members. The spacer block spaces the sun gears from each other.

4 Claims, 3 Drawing Figures

DIFFERENTIALS

BACKGROUND OF THE INVENTION

This invention relates to limited slip differentials for motor vehicles for use in a driving axle or between two driving axles.

PRIOR ART

Limited slip differentials incorporating reversible worm-wormwheel drives are known, as described in U.S. Pat. Nos. 2,559,916, 2,631,475, 2,859,641 and 4,191,071. Such differentials are of the "cross-axis planetary" type having co-axial output shafts each carrying a sun gear in the form of a worm-wheel meshing with an associated worm or set of worms. The axis of each worm is thus transverse to and displaced radially from the axis of the sun gears. A spur pinion is integral with each end of each worm and meshes with the corresponding spur pinion of a worm meshing with the other sun gear. These spur pinions further increase the radial bulk of the differential. Also, the correct positioning of the transverse worm assemblies presents manufacturing difficulties.

Moreover, as indicated in U.S. Pat. No. 3,849,862 such differentials could be noisy under certain test conditions, somewhat inefficient in delivering power therethrough and did not always give a good division of power between the left and right drive wheels of a vehicle. As indicated in U.S. Pat. No. 3,849,862 additional steps are required to overcome these problems.

SUMMARY OF THE INVENTION

According to the present invention there is provided a limited slip differential for a vehicle, comprising: a gear carrier mountable for rotation about an axis of the carrier: first and second worm members mounted for rotation within the carrier with their axes parallel to the carrier axis; an idler worm wheel mounted for rotation in the carrier between, and meshing with, helical worm formations on worm portions of both the worm members, each worm portion forming a reversible but frictional worm drive with the worm wheel; and first and second sun gear wheels coaxial with the carrier axis and meshing directly or indirectly with planet pinion portions of the respective worm members.

The planet pinion portion of each worm member may be formed as a continuation of the helical worm formation of the worm portion and mesh with correspondingly helical teeth on the respective shaft gear wheel. Alternatively the worm and planet pinion portions may be formed by separate gear conformations.

DESCRIPTION OF THE DRAWINGS

An embodiment of the invention will now be described, by way of example, with reference to the accompanying drawings, in which.

DESCRIPTION OF PREFERRED EMBODIMENT

Figure 1:
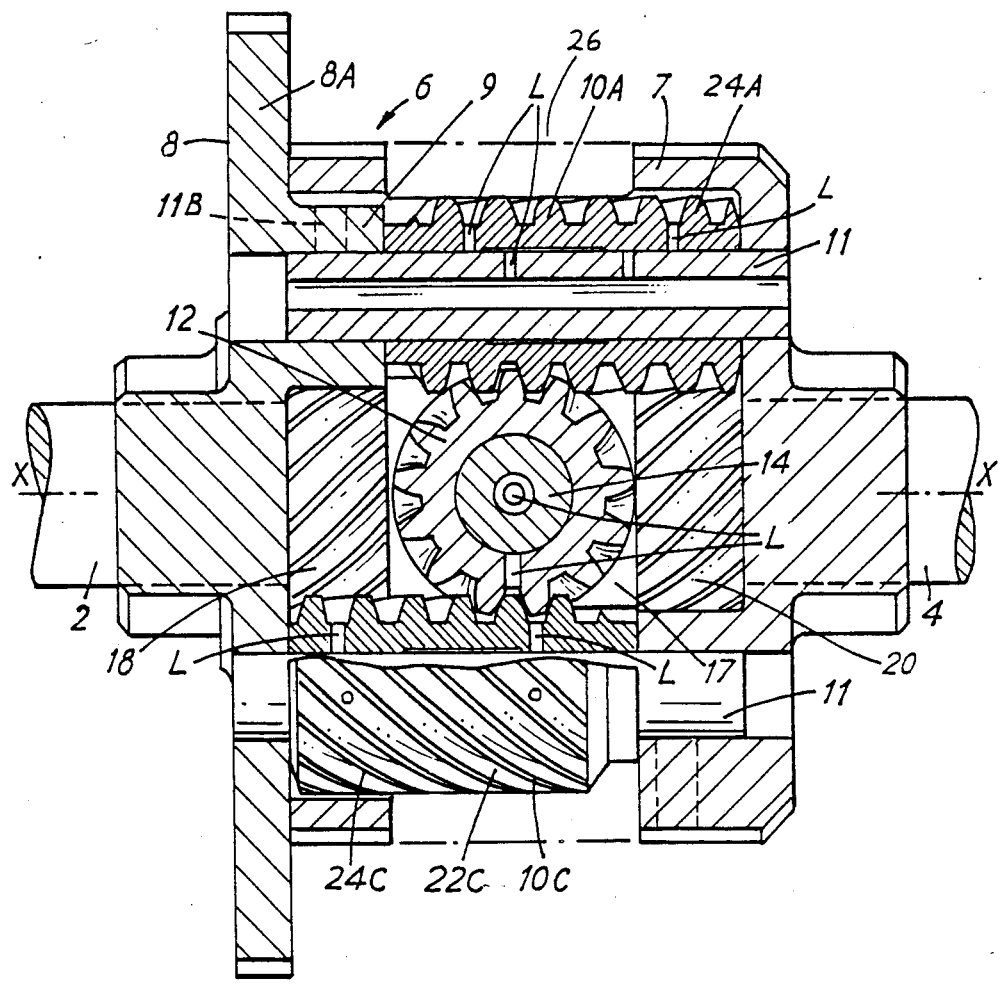
FIG. 1 is a chordal sectional view of a differential according to the invention on the line I—I of FIG. 2.
Figure 2:
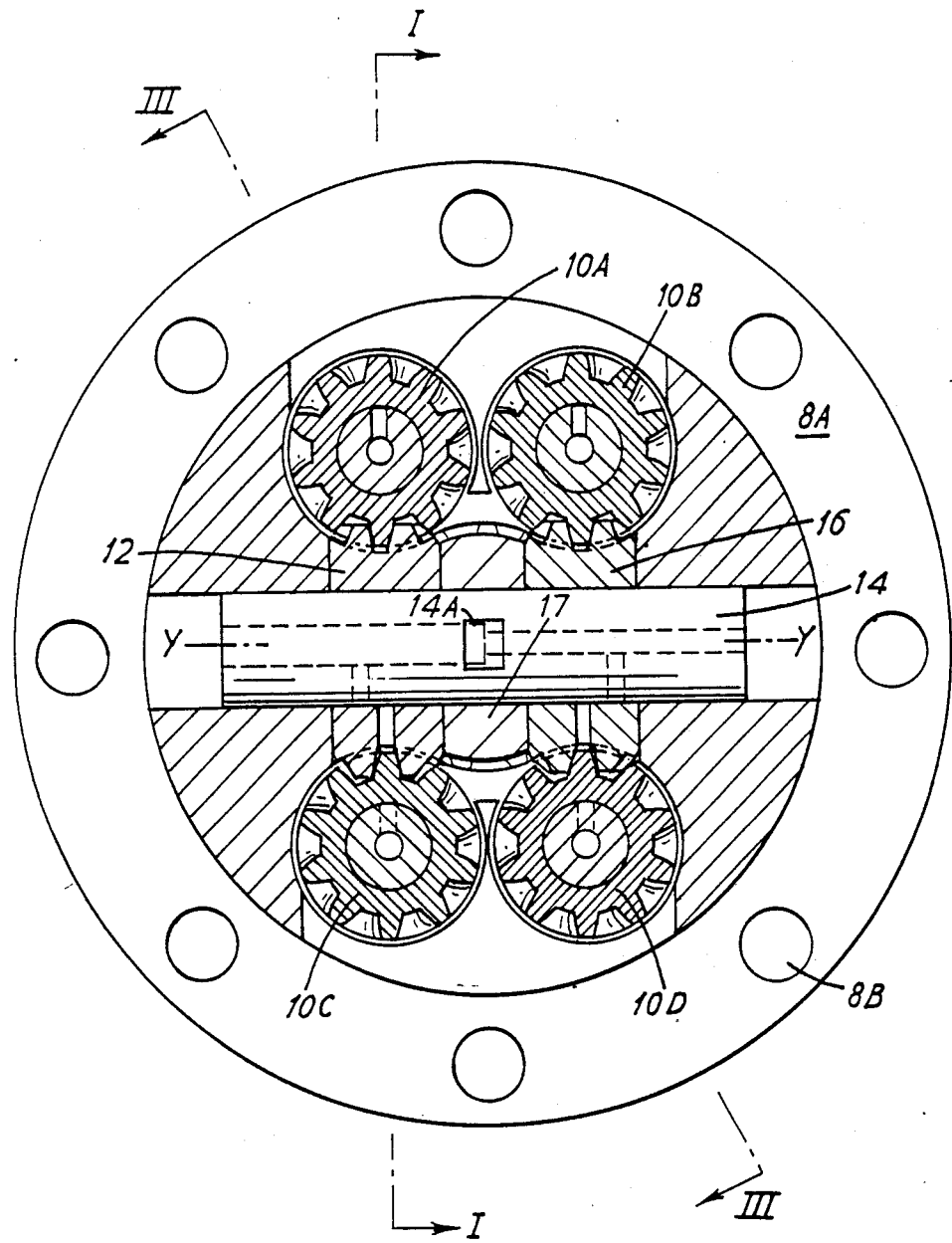
FIG. 2 is a cross sectional view along the lines II of FIG. 3.
Figure 3:
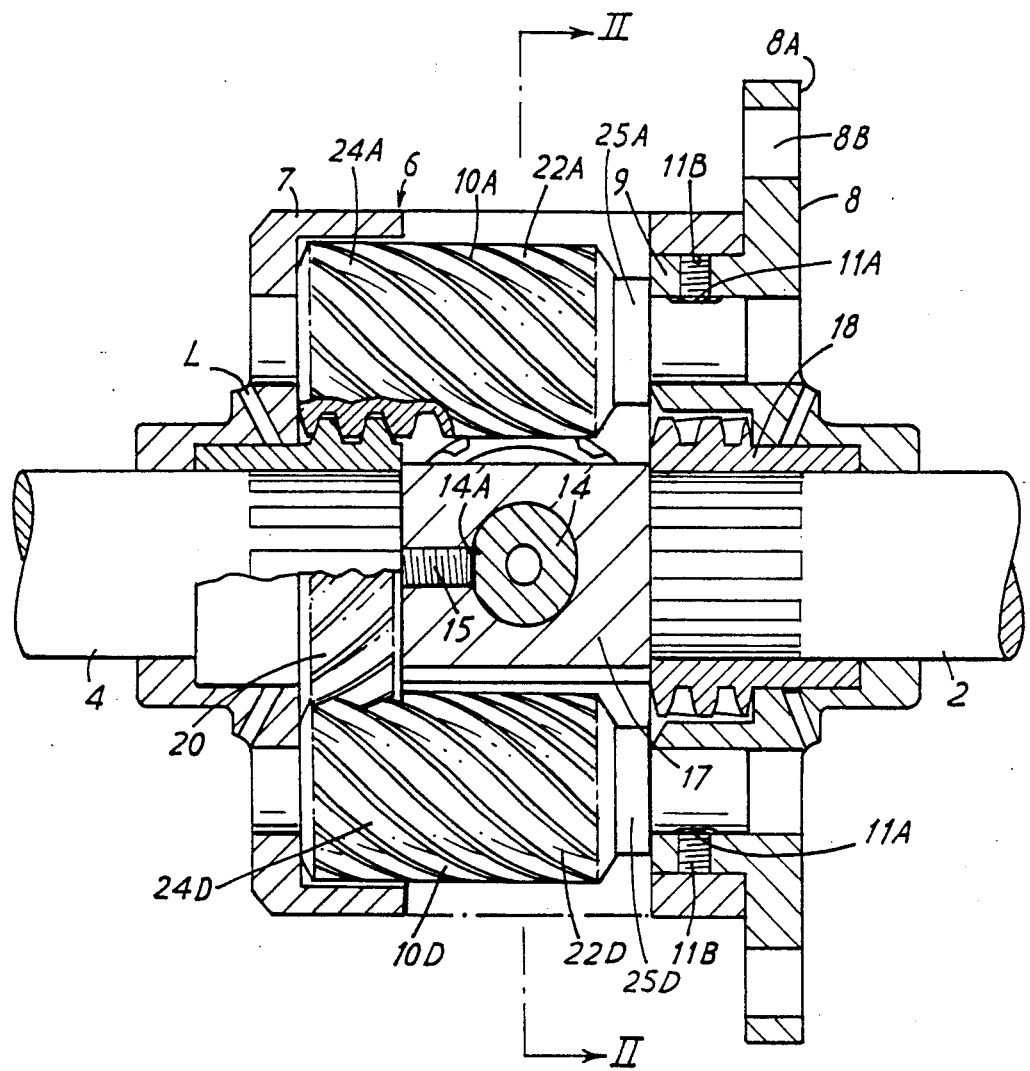
FIG. 3 is a axial sectional view along the line III—III of FIG. 2.

The differential shown in the drawings transmits drive from transfer gearing (not shown) to half-shafts 2 and 4 of a driven axle, for example of a motor car.

The differential has a gear carrier 6 formed by a bell-shaped housing 7 and a cover member 8 having a flange 8A and a hub portion 9 snugly engaged in the mouth of the housing 7. The flanges 8A may be formed with a ring of gear teeth or, as shown here, with a ring of holes 8B for bolts securing a bevel crown wheel or a transfer gear (not shown). The housing 7 and cover member 8 are secured together by suitable bolts or screws (not shown) to form the gear carrier 6.

Four worm members 10A–10D are rotatably mounted on hollow pins 11 supported in the gear carrier 6 at each of their ends. The worm members 10 and their pins 11 are parallel and equally spaced from the axis of the shafts 2 and 4. Each pin 11 is formed with a seating 11A for a grub screw 11B. Two of the worm members, 10A and 10C, mesh with a worm wheel 12 at diametrically opposed positions. The worm wheel 12 is located between the worm members 10A and 10C and is rotatably supported on a hollow support pin 14 mounted in the housing 7. The other two worm members, 10B and 10D, mesh with a further worm wheel 16 located between them, and also mounted on the support pin 14 but spaced along the support pin 14 by means of a spacer block 17. The pin 14 has a seating 14A for a securing grub screw 15 in the spacer block 17.

The worm wheels 12 and 16, the spacer block 17 and the support pin 14 are aligned on an axis YY which intersects the axis XX at right angles.

Half-shaft sun-gears 18 and 20 are respectively splined to (or formed integrally with) the inner ends of the half-shafts 2 and 4 and are aligned on the axis XX. Each half-shaft sun gear is within the gear carrier 6 and meshes with an extension on one of the worm members of each pair of worm members meshing with a respective worm wheel. Thus, the half-shaft sun gear 18 meshes with worm members 10B and 10C which mesh respectively with worm wheels 16 and 12. The half-shaft sun gear 20 meshes with worm members 10A and 10D which mesh respectively with worm wheels 12 and 16.

Each worm member thus has a worm portion 22, having a helical thread and meshing with a worm wheel, and an extension forming a pinion portion 24 meshing with a half-shaft sun gear. The helix angle of the worm portions 22 and worm wheels 12 and 16 is such that the worm drive is reversible (in this case 43.1° to the axis, for the worms) i.e. operates bi-directionally. In this embodiment the half-shaft sun gears 18 and 20 and the pinion portions 24 of the worm members are helical, the pinion portion 24 being formed by continuations of the worm formation of the worm portions 22.

Each worm member also has a reduced-diameter untoothed portion 25 adjoining the worm portion to avoid engagement with the other half-shaft sun gear.

OPERATION

In operation, when the vehicle is travelling straight ahead with the road wheels turning at the same speed the gear carrier 6 is rotated about the axis XX. The rotary motion is transmitted to the half-shafts 2 and 4. The half-shafts, the gear carrier 6 and the gearing within the gear carrier rotate as a unit. There is no movement of the worms 10 or worm wheels 12, 16 about their axes.

When the vehicle corners, one half-shaft must rotate faster than the gear carrier 6 and the other half-shaft slower than the gear carrier. If the half-shaft 2 rotates faster than the gear carrier 6 it, through the half-shaft sun gear 18, causes the worms 10B and 10C to rotate about their axes in the gear carrier 6. The worms 10B and 10C in turn cause the worm wheels 16 and 12 to turn about the support pin 14. Because the worm drive is reversible, the worm wheels 16 and 12 cause the worms 10D and 10A to rotate in the opposite sense to worms 10B and 10C. Although the worm drive is reversible, drive is not transmitted with 100% efficiency from the worm wheels to the worm members. In this embodiment the efficiency is about 70%. As a result, there is frictional resistance to operation of the device and it functions as a limited slip differential. The rotation of the worm members 10D and 10A causes the sun gear 20 and the half-shaft 4 to rotate slower than the carrier 6 and hence they appear to be turning backward relative to the carrier.

The steel worm members, worm wheels and spacer block must be robust and wear resistant and in this embodiment the worm wheels (and advantageously the worms and the spacer block especially where engine oil is the only available lubricant) can be case hardened and then receive anti-scuffing treatment such as 'No Scuff' available from British Heat Treatments Limited of Lowestoft.

The helix angle of the worms to the worm axis may be chosen to equal the angle of friction between the tires and a wet road.

The housing 7 is formed with large openings 26 both to reduce mass and to assist the circulation of lubricating oil. Preferably, the lubricating oil is hypoid gear oil. Lubrication is ensured by oil passages L drilled in the various components.

The limited slip differential described above may be used to transmit drive to two further such differentials in the two driving axles (e.g. front and rear) of a four-wheel drive vehicle.

In a modification (not shown in the drawings), the grub screws 11B and seatings 11A are omitted and the untoothed portions 25 of the worms are replaced by flanges of corresponding diameter and axial length on the pins to provide axial location of the latter while allowing them to rotate.

If desired, further friction in the differential can be generated by axially biasing the worm members, for example by means of Belleville washers located on the pins between the worms and either the casing or the pin flanges (if used).

I claim:

1. A limited slip differential for a vehicle, comprising:

a gear carrier mountable for rotation about a longitudinal axis of said carrier, a pin extending within said carrier, said pin having its axis transverse to said carrier axis, said pin being mounted by its ends in said carrier, first and second worm wheels rotatably mounted on said pin, four helically toothed worm members rotatably mounted in said carrier with the axis of each said worm member extending longitudinally in said carrier, the first and the third of said worm members meshing with a first of said worm wheels on opposite portions of the circumference of said first worm wheel, the second and the fourth of said worm members meshing with the second of said worm wheels on opposite portions of the circumference of said second worm wheel, a spacer block on said pin, said spacer block being separate from the carrier and having on two opposed faces thereof worm wheel locating surfaces each to engage a first side surface of a respective one of said worm wheels, said carrier having two further worm wheel locating surfaces to engage second side surfaces of said worm wheels, first and second helical sun gears coaxial with said carrier axis, each said sun gear being rotatably mounted with respect to said carrier, said first sun gear meshing with continuous extensions of the helical teeth on said second and third worm members, said second sun gear meshing with continuous extensions of the helical teeth on said first and fourth worm members, and said spacer block spacing said sun gears from each other.

2. The differential claimed in claim 1, in which the distances between the axes of the first and second worm members and between the axes of the third and fourth worm members are each less than the distances between the axes of the first and third worm members and between the axes of the second and fourth worm members.

3. The differential claimed in claim 1, in which said spacer block is secured to said pin.

4. The differential claimed in claim 1, in which said carrier is of a two-piece construction and includes a bell-shaped member disposed longitudinally in alignment with the longitudinal axis of the carrier, and a cover member fixedly secured to the open end of the bell-shaped member, said pin being disposed interiorly of and extending transversely relative to the bell-shaped member, and said spacer block being separate from said carrier.

* * * * *